(12) United States Patent
Xu et al.

(10) Patent No.: US 6,686,314 B2
(45) Date of Patent: *Feb. 3, 2004

(54) RECEIVER/TRANSFER MEDIA FOR PRINTING AND TRANSFER PROCESS

(76) Inventors: Ming Xu, 2808 Gaston Gate, Mt. Pleasant, SC (US) 29464; Barbara Wagner, 1477 Oaklanding Rd., Mt. Pleasant, SC (US) 29464

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/264,939

(22) Filed: Mar. 9, 1999

(65) Prior Publication Data

US 2001/0044011 A1 Nov. 22, 2001

Related U.S. Application Data

(60) Provisional application No. 60/092,353, filed on Jul. 10, 1998.

(51) Int. Cl.$^7$ .......................... B41M 5/035; B41M 5/38
(52) U.S. Cl. ....................................... 503/227; 156/235
(58) Field of Search ......................... 428/195; 8/471; 503/227; 156/235

(56) References Cited

U.S. PATENT DOCUMENTS

| | | | |
|---|---|---|---|
| 3,881,491 A | 5/1975 | Whyte | 128/287 |
| 4,387,132 A | 6/1983 | Hain | 428/211 |
| 4,549,824 A | 10/1985 | Sachdev et al. | 400/241.1 |
| 4,554,181 A | 11/1985 | Cousin et al. | |
| 4,810,390 A | 3/1989 | Flierl et al. | 210/650 |
| 5,108,383 A | 4/1992 | White | 604/368 |
| 5,165,973 A | 11/1992 | Kojima et al. | 428/331 |
| 5,330,459 A | 7/1994 | Lavon et al. | 604/385.1 |
| 5,474,843 A | 12/1995 | Lambert et al. | 428/327 |
| 5,478,631 A | 12/1995 | Kawano et al. | 428/212 |
| 5,488,907 A | 2/1996 | Xu et al. | |
| 5,514,413 A | 5/1996 | Van't Hof et al. | 427/244 |
| 5,560,982 A | * 10/1996 | Sato | 428/216 |
| 5,660,928 A | 8/1997 | Stokes et al. | |
| 5,720,806 A | 2/1998 | Fuji et al. | 106/483 |
| 5,746,816 A | 5/1998 | Xu | |
| 5,984,467 A | * 11/1999 | Bodager et al. | 347/101 |

FOREIGN PATENT DOCUMENTS

| | | |
|---|---|---|
| EP | 0782931 | 7/1997 |
| GB | 2323800 | 10/1998 |
| JP | 53053414 | 5/1978 |
| JP | 8207450 | 8/1996 |
| WO | WO 9718090 | 5/1997 |
| WO | WO 0006392 | 2/2000 |

* cited by examiner

Primary Examiner—B. Hamilton Hess
(74) Attorney, Agent, or Firm—B. Craig Killough

(57) ABSTRACT

A media for receiving a printed image during sublimation or heat activated liquid ink printing, and for transferring the image to a final substrate during subsequent heat transfer and activation. The media improves the quality of the finally transferred image and reduces the energy required to effect the transfer of the sublimation dyes. The media comprises multiple layers, including a feathering control layer containing a non-reactive, non-porous material; a dye screening layer, comprised of a porous material, which holds solid dye particles close to the surface of the media, while allowing other materials in the liquid ink to pass through; an absorbent liquid retaining layer; and a support layer. An optional permeation control layer allows liquids, such as aqueous or non-aqueous solutions, to pass through to subsequent layers during printing, while preventing dye vapor from penetrating beyond the dye screening layer during the final transfer step. The screening and/or absorbent layers may contain chemicals that produce an exotherm upon application of sufficient heat.

4 Claims, 1 Drawing Sheet

US 6,686,314 B2

RECEIVER/TRANSFER MEDIA FOR PRINTING AND TRANSFER PROCESS

Priority is claimed under 35 USC §119(e) in view of application Ser. No. 60/092,353, filed Jul. 10, 1998.

FIELD OF THE INVENTION

This invention relates to a media for receiving a printed image during sublimation or heat activated ink printing, and for transferring the image to a final substrate.

BACKGROUND OF THE INVENTION

Transfer printing processes involve physically transferring an image from one substrate to another. One heat transfer method is melt transfer printing. A design is first printed on paper using a waxy ink. The back side is then heated with pressure, while the printed side is in close contact with a final substrate. The ink melts onto the final substrate in the mirror image of the original image.

Another method of transfer printing is film release transfer. The image is printed onto a paper substrate coated with a film of heat tackifiable resin. Upon application of heat and pressure to the back side of the image, the entire film containing the image is transferred to the final substrate. The printing method used in this invention most commonly employs heat activated dyes, such as sublimation dyes. One form of an appropriate transfer process using liquid sublimation inks is described in Hale et al., U.S. Pat. No. 5,601,023, the teachings of which are incorporated herein by reference. An image is generally printed onto an intermediate media using heat activated dyes. Heat and pressure are applied to the back side of the media, while the image is in close contact with a final substrate. The dyes vaporize, and are preferentially diffused into and/or absorbed by the final substrate to form the image on the substrate. The release of the dye during transfer depends on the vapor pressure of the dye and the rate of diffusion of the dye vapor through the layers of the paper, and the affinity of the dye for materials such as binders and additives contained in the paper substrate.

The dye transfer efficiency depends also on the competing vapor pressure from the carrier components such as water, solvent, co-solvent, humectant, polymeric and waxy materials and the like. An ink ingredient with a low melting temperature and high boiling temperature (higher than typical sublimation transfer temperature) also has a substantial negative impact on the release of the dye, especially if such an ingredient has an affinity towards the dye used in such ink. Materials and ingredients of this kind include humectants, coalescents, polymeric resins, and surfactants.

Sublimation or heat sensitive ink printing may be performed using an intermediate sheet or transfer sheet. The intermediate sheet may be paper. The paper may contain an ink acceptor material capable of readily absorbing the ink and allowing the droplets to coalesce, yet maintaining high resolution and color density. For effective sublimation transfer to take place, the liquid ink must be readily absorbed into the body of the media while the dye and/or dyes must remain relatively close to the surface of the media. The dyes used in sublimation transfer inks are relatively low in molecular weight, and preferably contain minimal active functional groups that inhibit volatility. The dyes are typically chosen from the disperse dye class. Such dyes are substantially insoluble in water or organic solvents. Dispersion of these dyes within the carrier is necessary to produce the ink, and printing of the ink so formed by commonly available digitally driven color printers, such as ink jet printers, requires a dye particle size of less than a few microns. There are a number of porous materials available with pore sizes just large enough to screen these disperse dyes from the bulk of the sublimation transfer ink.

The solid, insoluble dyes used to produce aqueous sublimation inks for use in ink jet printers tend to clog ink jet printer nozzles. This problem can be reduced by reducing the dye particle concentration in the ink formulation. However, to produce a stable ink, emulsifying enforcing agents and/or surfactants and other additives are used. To produce a printed image which will have enough color and vibrancy to be pleasing, sufficient dye must be present in the ink to overcome the presence of the added materials. The presence of these added materials reduces the ability of the dye to sublimate upon transfer or activation of the dye by the application of heat and pressure, and a higher concentration of dye must be present. The presence of the higher concentration of solid dye particles, however, aggravates the problem of ink jet nozzle clogging and agglomeration of the dye particles. Further, the presence of additional dye means that additional added materials must be present to produce a dye which is stable and has an adequate shelf life, but which further aggravate the problem of activation of the dye. The use of relatively higher concentrations of dye and higher concentrations of other materials in the ink requires relatively higher energy (heat) inputs to the media to transfer the image, and increases the transfer time.

SUMMARY OF THE INVENTION

The present invention relates to a media for receiving a printed image during sublimation or heat activated ink printing, and for transferring the image to a final substrate during subsequent heat transfer and activation. The media comprises multiple layers, including a feathering control layer containing a non-reactive, non-porous material. Beneath the feathering control layer is a dye screening layer, comprised of a porous material. The screening layer holds the solid dye particles close to the surface of the media, and allows the other materials in the ink to pass through. The distance that the dye vapor must traverse during transfer to the final substrate is thereby reduced, and the presence of other materials in the ink does not interfere with the activation or sublimation of the dye. An optional third permeation control layer is a liquid permeable, gas impermeable membrane. This semipermeable membrane allows liquids, such as aqueous or non-aqueous solutions, to pass through to subsequent layers during printing, while preventing dye vapor from penetrating beyond the dye screening layer during the final transfer step. In other words, this layer encourages dye vapor migration towards the final substrate, and retards the penetration of vapor from water or solvent toward the dye layer during the final heat transfer step. A fourth layer is an absorbent liquid retaining layer, followed by a support layer. The screening and/or absorbent layers may contain chemicals that produce an exotherm upon application of sufficient heat. Addition of these exothermic chemicals provides a means of minimizing the amount of externally applied energy necessary for transferring an image from the intermediate media to the final substrate.

An object of the invention is a receiver sheet which minimizes feathering of the ink as it is printed on the receiver/transfer sheet, to create an image having true color definition and high resolution. Another object of the invention is a receiver/transfer sheet which facilitates transfer of the dye vapor toward the final substrate as the dye is sublimated. An additional object of the invention is to produce a receiver/transfer sheet which separates the solid dye from the remaining ink components, so that interference of the components with the activation or sublimation of the dye is substantially reduced. An object of the invention is a receiver/transfer sheet which will permit the use of an ink formulation having a reduced concentration of dye solids. Another object of the invention is to produce a receiver/transfer sheet which will exotherm upon the application of heat to assist in heat transfer time. An additional object of the invention is a receiver/transfer sheet which will reduce the image transfer time and energy input requirements. It is an object of the present invention to provide a media that will receive a sublimation or heat sensitive ink that allows the ink to be immediately wicked from the surface with minimum amount of dot gain and without feathering or bleeding of the printed image, the dye to be held just on or just below the surface, and the ink carrier and other components of the ink to be absorbed beneath the dye layer, improving imaging quality and dye sublimation or diffusion efficiency. It is another object of the present invention to optionally add exothermic materials to the dye screening and/or ink absorptive layers to decrease the amount of externally applied energy necessary to effectively transfer the sublimation dye from the dye screening layer to the final substrate. It is a further object of the present invention to optionally provide a semipermeable layer between the dye screening layer and the absorbent liquid retaining layer to allow liquid to pass through the dye screening layer to the subsequent absorbent liquid retaining layer, yet prevent dye vapor from penetrating the media during heat transfer to a final substrate, substantially increasing the dye sublimation or diffusion efficiency, and increasing the transfer optical density onto the final substrate.

DESCRIPTION OF THE PREFERRED EMBODIMENT

Figure 1:
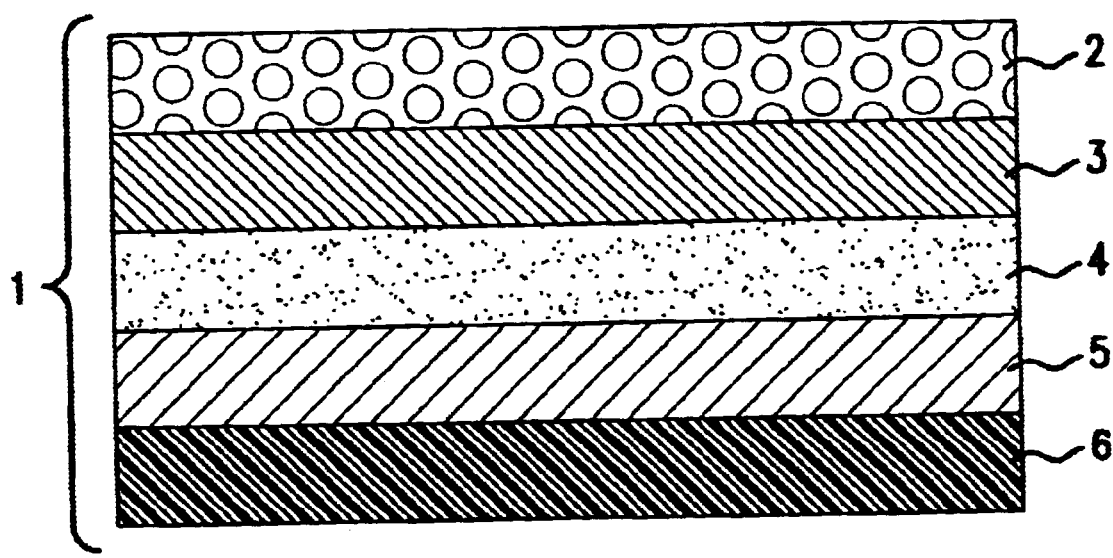
FIG. 1 shows a cross-section of a receiver/transfer media of the invention in which the support substrate 6 is coated on one side with an ink absorptive layer 5, an optional liquid permeable, gas impermeable permeation control layer 4, a dye screening layer 3, and a feathering control layer 2.

The feathering control layer 2 is present on the surface of the receiver/transfer sheet. It is non absorptive and retards feathering of the liquid ink which is printed onto the receiver/transfer sheet. The feathering control layer is preferred to comprise a non-reactive, substantially spherical, non-porous, non-absorptive material that receives the liquid sublimation ink and allows the liquid sublimation ink to pass from the feathering control layer on the surface to subsequent layers. This surface layer 2 aids in quick drying of the ink, and helps to prevent feathering of the ink. Examples of materials which are suitable for forming the feathering control layer are poly(dimethylsiloxane), anhydrous silica, glass beads, and the like. These materials are preferred to have a primary particle size of 1–20 $\mu$m diameter. The surface layer may be created by coating to a thickness of 2–25 $\mu$m. Binders may be used with the materials to form the surface layer and adhere it to the media. Treatments, such as surface conditioning to control surface energy, static control, and the like, may be applied for enhancement of the print quality.

It is generally desirable that the dye penetrate the media to the minimal effective level, since excessive penetration affects the image definition. Image definition is also improved by minimizing the distance the dye vapor traverses after sublimation and during transfer to reach the final substrate. For these reasons it is desirable to have a dye screening layer 3 near the surface of the media. A porous membrane may be used to filter, or screen, dye particles from the bulk of the liquid ink. Suitable membranes include microporous membranes whose pores are fine enough to retain the dye particles, yet allow minimum resistance to the passage of the liquid component of the ink, which may contain water, solvents, co-solvents, humectants, dispersants, and/or surfactants. Microporous membranes may include sheets and hollow fibers typically formed from polymeric material and having a substantially continuous matrix structure containing open pores of small size. The pore size range of microporous membranes generally range from 0.05–10 $\mu$m in diameter. Typically a pore diameter of approximately 0.05 $\mu$m should suffice to trap the sublimation dye particles. Examples of suitable membranes are, but are not limited to those made of high molecular organic material such as Teflon®, those made of inorganic materials, such as porous ceramic, porous graphite or zirconium-coated graphite membranes, polymeric materials, such as polyolefin, polysulfone, polyethersulfone, cellulose, or the like.

Another embodiment of the present invention incorporates a substantially porous material having a pore size small enough to allow only the dissolved liquid molecules to pass through, while retaining the undissolved dye particles. The mean pore diameter, for example, may be less than 0.05 $\mu$m. The material is sufficiently tightly packed and treated, so that there is minimal void volume, and no dye is allowed to flow through and between the porous particles. In this way the relatively large dye particles are effectively screened from the bulk of the ink and held in this screening layer close to the surface of the media. The liquid portion of the ink penetrates this layer.

The dye screening layer may contain a heat sensitive material which exotherms upon application of sufficient heat. As heat is externally supplied to the receiver/transfer media during transfer of the printed image from the dye screening layer to the final substrate, additional heat is generated by the exothermic reaction. This additional heat lowers the amount of externally applied energy which is necessary to transfer the dye from the dye receptive screening layer to the final substrate, and/or reduces transfer time. Examples of such exothermic materials are aromatic azido compounds, such as 4,4'-bis(or di)azido-diphenylsulfone, which will undergo thermal decomposition, with the loss of molecular nitrogen as the only volatile component, forming an electron-deficient species and rapid energy dissipation and stabilization. Other examples are aromatic azido compounds carrying a water-solubilizing group, such as a sulfonic acid or carboxylic acid group. These exothermic materials typically show an exotherm in the temperature range of 170–200C. Typical heat transfer temperatures are in the range of 175–215C., and are thus sufficient to initiate this exotherm.

A permeation control layer 4 may be included. Layer 4 has a semipermeable membrane which is substantially permeable to liquids and substantially impermeable to gases. As shown in FIG. 1, the layer is positioned between dye screening layer 3 and liquid retaining layer 5. Layer 4 allows liquid from the ink to pass through the dye screening layer to the liquid retaining layer during printing, and prevents dye vapor from back-diffusing in the direction of the liquid retaining layer during heat transfer to the final substrate. The membrane also prevents vapor associated with the solvent, co-solvent or water in the liquid retaining layer from penetrating and traversing back into the top dye-containing layers. Such vapor competes with the dye sublimation vapor, and decreases the transfer efficiency, image quality, and/or final fastness quality of such transferred image on the final substrate, while increasing the transfer time and/or energy requirements for transfer. Examples of suitable semipermeable membranes are disclosed in U.S. Pat. No. 5,330,459, and include Nylon 6 film, polyvinylchloride film, Rohm & Haas high Acrylonitrile barrier film, and cellulose acetate film disclosed in U.S. Pat. No. 5,108,383.

Liquid retaining layer 5 has an absorbent property which absorbs the bulk of the liquid carrier which is contained in the ink. Liquid inks used with the media may contain water as a liquid carrier, into which emulsifying enforcing agents, solvents, co-solvents, humectants, dispersants, and/or surfactants are dissolved or are present. Absorbent materials which may be used to form the liquid retaining layer include, but are not limited to, porous materials such as silica gel, aluminum oxide, zeolite, porous glass; polymers based on methacrylate, acrylate, and the like; monomers with suitable cross-linking agents such as divinylbenzene; liquid swellable materials such as clays and starches, for example, montmorillonite type clays; fillers, such as calcium carbonate, kaolin, talc, titanium dioxide, and diatomaceous earth. Water-soluble polymers, such as polyvinyl alcohol, modified polyvinyl alcohol, cellulose derivatives, casein, gelatin, sodium alginate, and chitosin are typically used as binders. Water-insoluble polymers may be used as binders. Examples of such are styrene-butadiene copolymers, acrylic latex, and polyvinyl acetate. The absorbent liquid retaining layer may contain chemicals which react irreversibly with water and/or solvents to render them non-volatile. An example of such a chemical is polyvinyl alcohol. The liquid retaining layer 5 may contain an exothermic material as described above.

The base substrate 6 is typically a sheet material which may be transparent, translucent, or opaque. Useful transparent or translucent materials include cellulose acetate, polyethylene terephthalate, polystyrene, polyvinylchloride, and the like. Useful opaque materials include paper made of natural cellulose fiber materials, polyethylene-clad paper, opaque filled paper, and the like. The base layer may be coated with a subbing layer to increase the adhesion of the absorbent layer to the base.

What is claimed is:

1. A method of printing and transferring heat activated dye, comprising the steps of:
    a. printing a liquid ink, wherein said liquid ink comprises heat activated dye solids that sublimate upon the application of sufficient heat to said heat activated dye solids, and a liquid carrier, wherein said heat activated dye solids are substantially insoluble in said liquid carrier;
    b. printing said heat activated dye solids upon a receiving and transfer media, said receiving and transfer media comprising a liquid retaining layer for absorbing and retaining said liquid carrier which is contained in said liquid ink, a permeation control layer having a membrane which is substantially impermeable to gases and substantially permeable to liquids, wherein said permeation control layer is formed over said liquid retaining layer, and a base layer, wherein said liquid carrier passes through said permeation control layer and is absorbed by said liquid retaining layer, and wherein said heat activated dye solids are retained above said membrane of said permeation control layer; and
    c. positioning a substrate against said receiving and transfer media, and applying heat to said receiving and transfer medium, wherein said heat activated dye solids sublimate and transfer to said substrate, and wherein said permeation control layer prevents steam generated by heating of said liquid carrier from passing though said permeation control layer.

2. A method of printing and transferring heat activated dye as described in claim 1, wherein said receiving and transfer media further comprises a dye screening layer which is formed over said permeation control layer, wherein said dye screening layer allows said liquid carrier to pass through said dye screening layer, and retains at least a portion of said solid dye particles.

3. A method of printing and transferring heat activated dye as described in claim 2, wherein said receiving and transfer media further comprises a feathering control layer which is comprised of a non-porous, non-absorptive material that receives said liquid ink and allows said liquid ink to pass through said feathering control layer, wherein said feathering control layer is positioned over said permeation control layer, and wherein said permeation control layer is an outer layer.

4. A method of printing and transferring heat activated dye as described in claim 1, wherein said receiving and transfer media further comprises a feathering control layer which is comprised of a non-porous, non-absorptive material that receives said liquid ink and allows said liquid ink to pass through said feathering control layer, and wherein said feathering control layer is positioned over said permeation control layer.

* * * * *